United States Patent
Parnin et al.

(10) Patent No.: US 12,049,850 B1
(45) Date of Patent: Jul. 30, 2024

(54) FAN DRIVE GEAR SYSTEM GUTTER EJECTOR SYSTEM

(71) Applicant: RTX CORPORATION, Farmington, CT (US)

(72) Inventors: Francis Parnin, Suffield, CT (US); David Allen Stachowiak, Durham, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/370,511

(22) Filed: Sep. 20, 2023

(51) Int. Cl.
  *F02C 7/36* (2006.01)
  *F01D 25/18* (2006.01)
  *F02C 7/06* (2006.01)

(52) U.S. Cl.
  CPC ............... *F02C 7/36* (2013.01); *F01D 25/18* (2013.01); *F02C 7/06* (2013.01); *F05D 2220/36* (2013.01); *F05D 2260/40311* (2013.01); *F05D 2260/98* (2013.01)

(58) Field of Classification Search
  None
  See application file for complete search history.

(56) References Cited

U.S. PATENT DOCUMENTS

| | | | | |
|---|---|---|---|---|
| 4,213,307 A | * | 7/1980 | Watson | F04D 29/063 62/468 |
| 8,484,942 B1 | * | 7/2013 | McCune | F01D 25/18 384/473 |
| 9,404,420 B2 | | 8/2016 | Gallet et al. | |
| 2009/0101444 A1 | * | 4/2009 | Alecu | F16N 39/04 184/11.2 |
| 2013/0319798 A1 | * | 12/2013 | Sheridan | F01D 25/20 184/6 |
| 2015/0292359 A1 | * | 10/2015 | Ketchum | F02C 7/36 415/1 |
| 2016/0245117 A1 | * | 8/2016 | Parnin | F16N 39/002 |
| 2016/0376949 A1 | * | 12/2016 | Parnin | F02C 7/06 73/112.01 |
| 2016/0376988 A1 | * | 12/2016 | Sheridan | F02K 3/06 60/39.08 |
| 2021/0123385 A1 | * | 4/2021 | Schwendenmann | F16H 57/0424 |

FOREIGN PATENT DOCUMENTS

FR 3130892 A1 6/2023

* cited by examiner

*Primary Examiner* — Katheryn A Malatek
(74) *Attorney, Agent, or Firm* — Carlson, Gaskey & Olds, P.C.

(57) ABSTRACT

A fan drive gear system for a turbine engine includes a sun gear that is configured to be driven by an engine shaft that is rotatable about an axis, a plurality of intermediate gears that are intermeshed with the sun gear, a ring gear assembly that is engaged with the plurality of intermediate gears, the ring gear configured for attachment to a static structure, a carrier that supports rotation of the plurality of intermediate gears, the carrier configured for rotation about the axis, a fixed gutter system that is configured to receive expelled lubricant and to direct the expelled lubricant to an auxiliary reservoir, at least one ejector that is disposed within the fixed gutter and configured to utilize a motive flow to generate a lubricant flow through at least one outlet, and a fan shaft that is rotatable about the axis and configured to be driven by the carrier.

19 Claims, 5 Drawing Sheets

FAN DRIVE GEAR SYSTEM GUTTER EJECTOR SYSTEM

TECHNICAL FIELD

The present disclosure relates generally to an aircraft propulsion system that includes a fan drive gear system with a rotating carrier and a lubricant ejector to impart momentum on exhausted lubricant.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. A carrier may support a plurality of planetary gears and rotate about an engine axis. Rotation of the carrier can present challenges for recovering lubricant expelled from the gear system during operation. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, a plurality of intermediate gears that are intermeshed with the sun gear, a ring gear assembly that is engaged with the plurality of intermediate gears, the ring gear is configured for attachment to a static structure, a carrier that supports rotation of the plurality of intermediate gears, the carrier is configured for rotation about the axis, a fixed gutter system that is configured to receive expelled lubricant and to direct the expelled lubricant to an auxiliary reservoir, at least one ejector that is disposed within the fixed gutter and configured to utilize a motive flow to generate a lubricant flow through at least one outlet, and a fan shaft that is rotatable about the axis and configured to be driven by the carrier.

In a further embodiment of the foregoing fan drive gear system, the motive flow includes a bleed airflow.

In a further embodiment of any of the foregoing fan drive gear systems, the fixed gutter system includes an outlet that is configured to separate the motive flow from the lubricant flow.

In a further embodiment of any of the foregoing fan drive gear systems, the fixed gutter system includes an annular space that is disposed between an inner static baffle portion and an outer gutter portion.

In a further embodiment of any of the foregoing fan drive gear systems, the at least one ejector is disposed within the annular space.

In a further embodiment of any of the foregoing, the fan drive gear system includes a plurality of inlets through the static baffle for communicating the received lubricant into the annular space.

In a further embodiment of any of the foregoing, the fan drive gear system includes at least one baffle where expelled lubricant is captured and directed into the fixed gutter system.

In a further embodiment of any of the foregoing fan drive gear systems, the ring gear includes a forward face and an aft face and the at least one baffle includes a forward baffle that is attached to the forward face and an aft baffle that is attached to the aft face, and the fixed gutter system includes a forward gutter assembly that is radially outside the forward baffle and an aft gutter assembly that is radially outside the aft baffle.

In a further embodiment of any of the foregoing fan drive gear systems, each of the forward baffle and the aft baffle includes an annular accumulation portion. Accumulated lubricant is directed radially outward by circumferential and radial momentum imparted into the lubricant.

In a further embodiment of any of the foregoing fan drive gear systems, each of the intermediate gears is supported by a journal bearing that is supported within the carrier and lubricant expelled from each of the journal bearings is directed through the at least one baffle.

A turbine engine assembly according to another exemplary embodiment of this disclosure includes, among other possible things, a static engine structure, a fan section that includes a fan shaft that is coupled to a hub that supports a plurality of blades that re rotatable about an axis, a fan drive gear system that includes a sun gear that is configured to be driven by an engine shaft that is rotatable about the axis, a plurality of intermediate gears, a ring gear assembly that is fixed to the engine static structure, a carrier that supports rotation of the plurality of intermediate gears, the carrier is rotatable about the axis and coupled to drive the fan shaft, and a forward gutter assembly that is configured to receive expelled lubricant forward of the carrier. An aft gutter assembly is configured to receive expelled lubricant aft of the carrier. At least one ejector is disposed within at least one of the forward gutter assembly and the aft gutter assembly and is configured to utilize a motive flow to generate a lubricant flow. A primary lubricant system communicates lubricant to the fan drive gear system, and an auxiliary lubricant system includes an auxiliary reservoir that is configured to receive lubricant that is expelled from the fan drive gear system and communicated through the forward fixed gutter assembly and the aft fixed gutter assembly.

In a further embodiment of the foregoing turbine engine assembly, the motive flow includes a bleed airflow from a compressor section.

In a further embodiment of any of the foregoing turbine engine assemblies, each of the forward gutter assembly and the aft gutter assembly includes an outlet that is configured to separate the motive flow from the lubricant flow.

In a further embodiment of any of the foregoing turbine engine assemblies, each of the forward gutter assembly and the aft gutter assembly includes an annular space that is disposed between an inner static baffle portion and an outer gutter portion.

In a further embodiment of any of the foregoing turbine engine assemblies, the at least one ejector is disposed within the annular space.

In a further embodiment of any of the foregoing, the turbine engine assembly includes at least one baffle where expelled lubricant is captured and directed into the fixed gutter system.

A lubrication system for a gas turbine engine according to another exemplary embodiment of this disclosure includes, among other possible things, a baffle system that is configured for attachment to a fixed ring gear and configured to direct lubricant that is expelled from a fan drive gear system, a forward gutter assembly that is configured to receive expelled lubricant forward of the ring gear, an aft gutter assembly that is configured to receive expelled lubricant aft of the ring gear, at least one ejector that is disposed within at least one of the forward gutter assembly and the aft gutter assembly and configured to utilize a motive flow to generate a lubricant flow, a primary lubricant system communicates lubricant to the fan drive gear system, and an auxiliary lubricant system includes an auxiliary reservoir that is configured to receive lubricant that is expelled from the fan drive gear system and communicated through the forward fixed gutter assembly and the aft fixed gutter assembly.

In a further embodiment of the foregoing lubrication system, each of the forward gutter assembly and the aft gutter assembly includes an outlet that is configured to separate the motive flow from the lubricant flow.

In a further embodiment of any of the foregoing turbine engine assemblies, each of the forward gutter assembly and the aft gutter assembly include an annular space that is disposed between an inner static baffle portion and an outer gutter portion.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
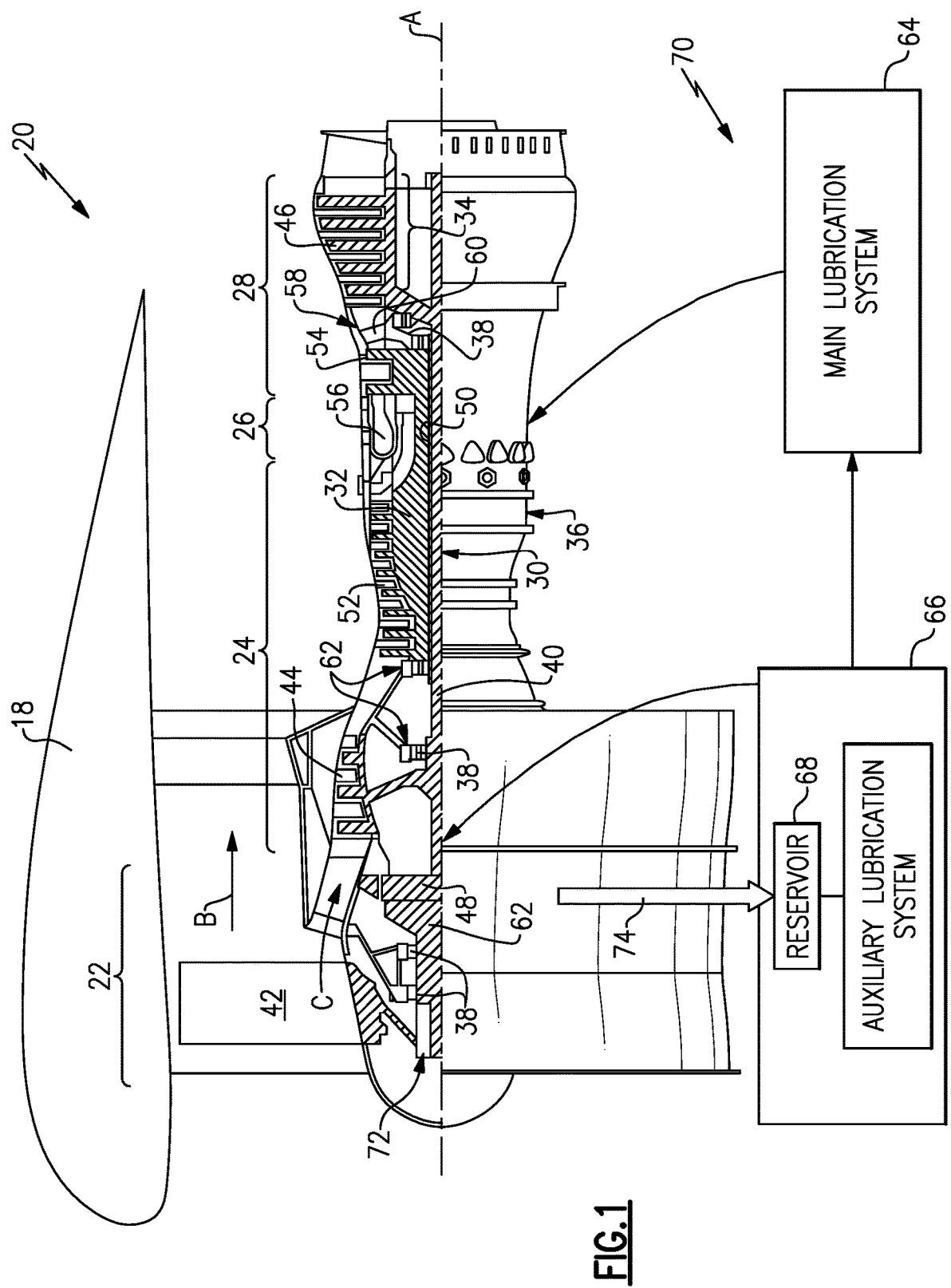
FIG. 1 is a schematic view of an example gas turbine engine including a planetary fan drive gear system.

FIG. 1 schematically illustrates a gas turbine engine 20 with an epicyclic fan drive gear system 48 having a rotating carrier that exhausts lubricant into a static gutter system. Momentum is imparted into the exhausted lubricant utilizing a motive flow communicated through a lubricant ejector disposed within the static gutter system.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72. Moreover, although the example turbine engine 20 is shown with the fan section 22 disposed within the nacelle 18, a turboprop engine is also within contemplation and scope of this disclosure.

The fan drive gear system 48 is an epicycle gear train with a gear reduction ratio of greater than about 5:1 and less than about 18:1. In another example embodiment, the fan drive gear system 48 provides a gear reduction ratio of between 8:1 and 13.5:1. The gear system 48 is coupled to the fan shaft 62 that is coupled to a hub 72 supporting a plurality of fan blades 42. The gear system 48 drives the fan blades 42 about the engine axis A. It should be understood, however, that the above parameters are only exemplary of one embodiment of a geared engine architecture and that the present disclosure is applicable to other gas turbine engine architectures including turbofan, turboshaft, and open rotor engines.

The example engine 20 includes a lubrication system 70 with a main lubrication system 64 and an auxiliary lubrication system 66. The auxiliary lubrication system 66 includes a reservoir 68 that receives lubricant expelled from the fan drive gear system 48. Lubricant from the auxiliary lubrication system 66 may be fed back to the main lubrication system and/or fed back to the gear system 48.

Figure 2:
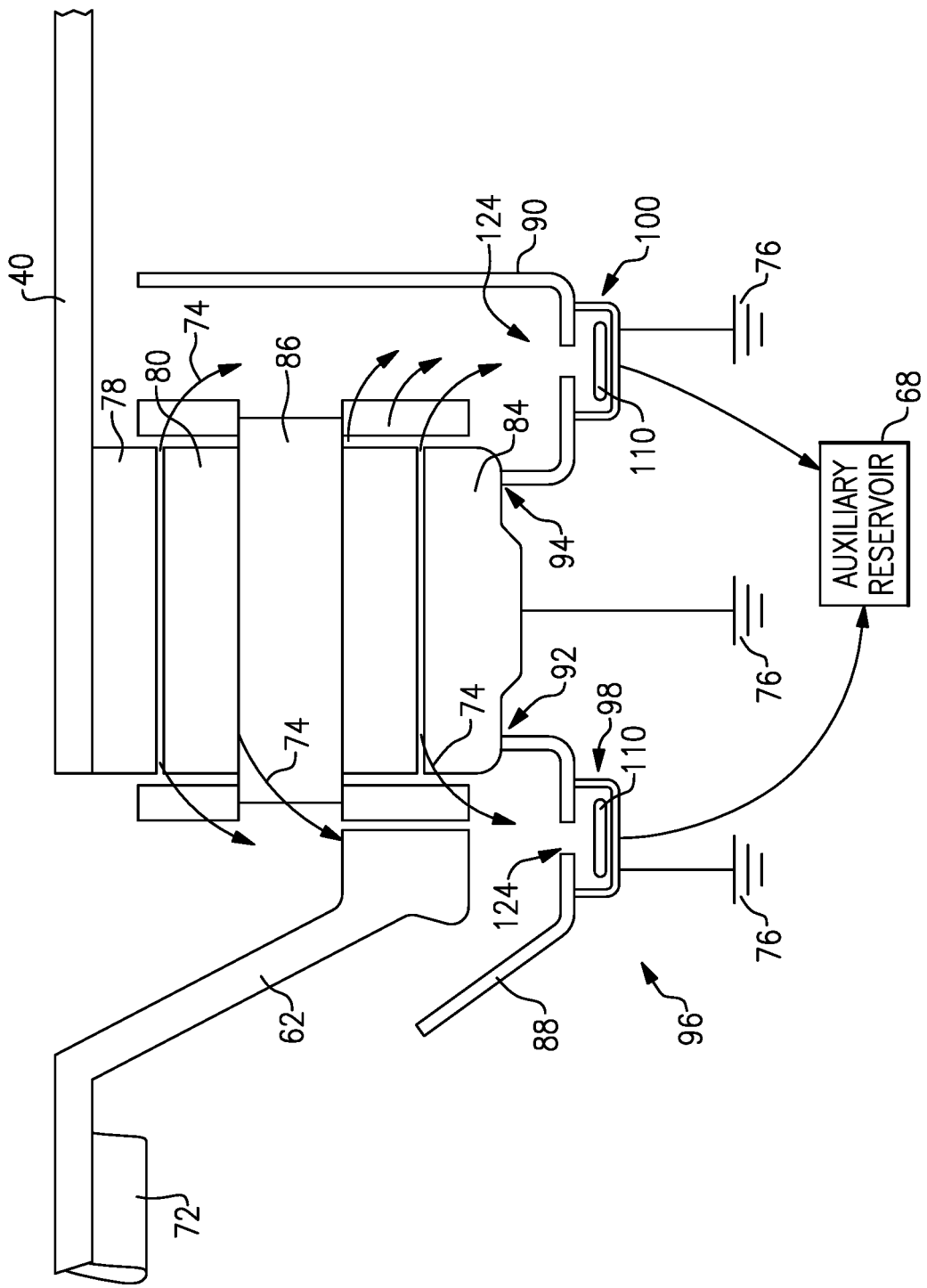
FIG. 2 is a schematic view of an example fan drive gear system.
Figure 3:
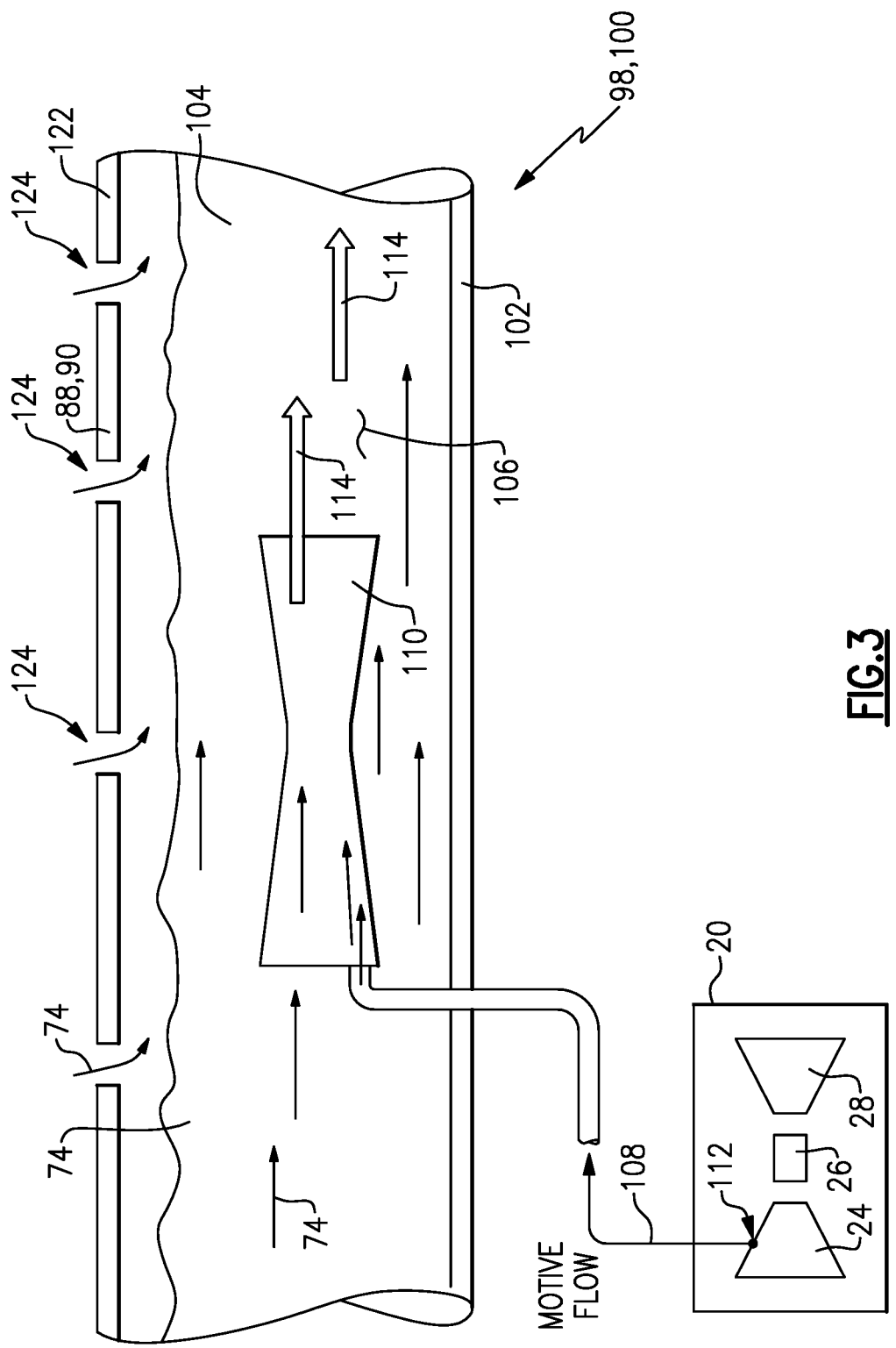
FIG. 3 is a schematic view of a portion of an example gutter system including a lubricant ejector.

Referring to FIGS. 2 and 3 with continued reference to FIG. 1, the example fan drive gear system 48 is an epicyclic gear system with a sun gear 78 coupled to a portion of the low shaft 40 and engaged to a plurality of intermediate gears 80 supported on a corresponding journal bearing 86 within a rotating carrier 82. A ring gear 84 circumscribes the intermediate gears 80 and is fixed to a static engine structure 76.

The fan shaft 62 is coupled to the carrier 82 and extends radially inward and forward of the gear system 48 to the fan hub 72. Lubricant is supplied to the gear system 48 from the main lubrication system 64. Lubricant is communicated to each gear interface and to the bearing surfaces between the journal bearings 86 and the intermediate gears 80. Lubricant is then expelled forward and aft of the gear system 48 into one of a forward static baffle 88 and an aft static baffle 90. The forward static baffle 88 is attached to a forward portion 92 of the non-rotating ring gear 84 and the aft static baffle 90 is attached to an aft portion 94 of the non-rotating ring gear 84. The forward and aft baffles 88, 90 direct lubricant into a static gutter system 96 that includes a forward static gutter assembly 98 and an aft static gutter assembly 100.

Oil expelled into the static baffles 88, 90 is directed into the static gutters 96, 100. In one embodiment the oil drainage is assisted by use of an ejector pump 110 (FIG. 3). In another possible embodiment the limited momentum imparted on the oil by the FDGS is used to assist the oil into the outboard static gutter.

Each of the static gutter assemblies 98, 100 includes at least one lubricant ejector 110 that utilizes a motive flow 108 to further accelerate lubricant 74. In one example embodiment, the motive flow 108 is a bleed airflow pulled from a tap 112 located in the compressor section 24 of the engine 20. Although, bleed airflow is utilized as the example motive flow 108, other fluids such as oil with sufficient pressure may also be utilized and are within the contemplation and scope of this disclosure.

Each of the example gutter assemblies 98, 100 includes an annular space 106 disposed between a radially outer static gutter portion 102 and a radially inner static baffle portion 122. The annular space 106 extends circumferentially about the gear system 48 and the engine axis A. The ejector 110 is disposed within the annular space 106 in a manner that allows lubricant flows 74 to pass through and around the ejector 110. A portion of lubricant flow 74 is communicated through the ejector 110 to generate an accelerated lubricant flow 114. Accordingly, lubricant 74 is communicated through radially facing outlets 124 in a corresponding one of the static baffles 88, 90 to the annular space 106. Once in the annular space 106, the lubricant 74 is moved along through the ejector 110 and accelerated. The accelerated flow 114 is a mixture of lubricant and bleed airflow 108 and moves along through the annular space 106.

Figure 4:
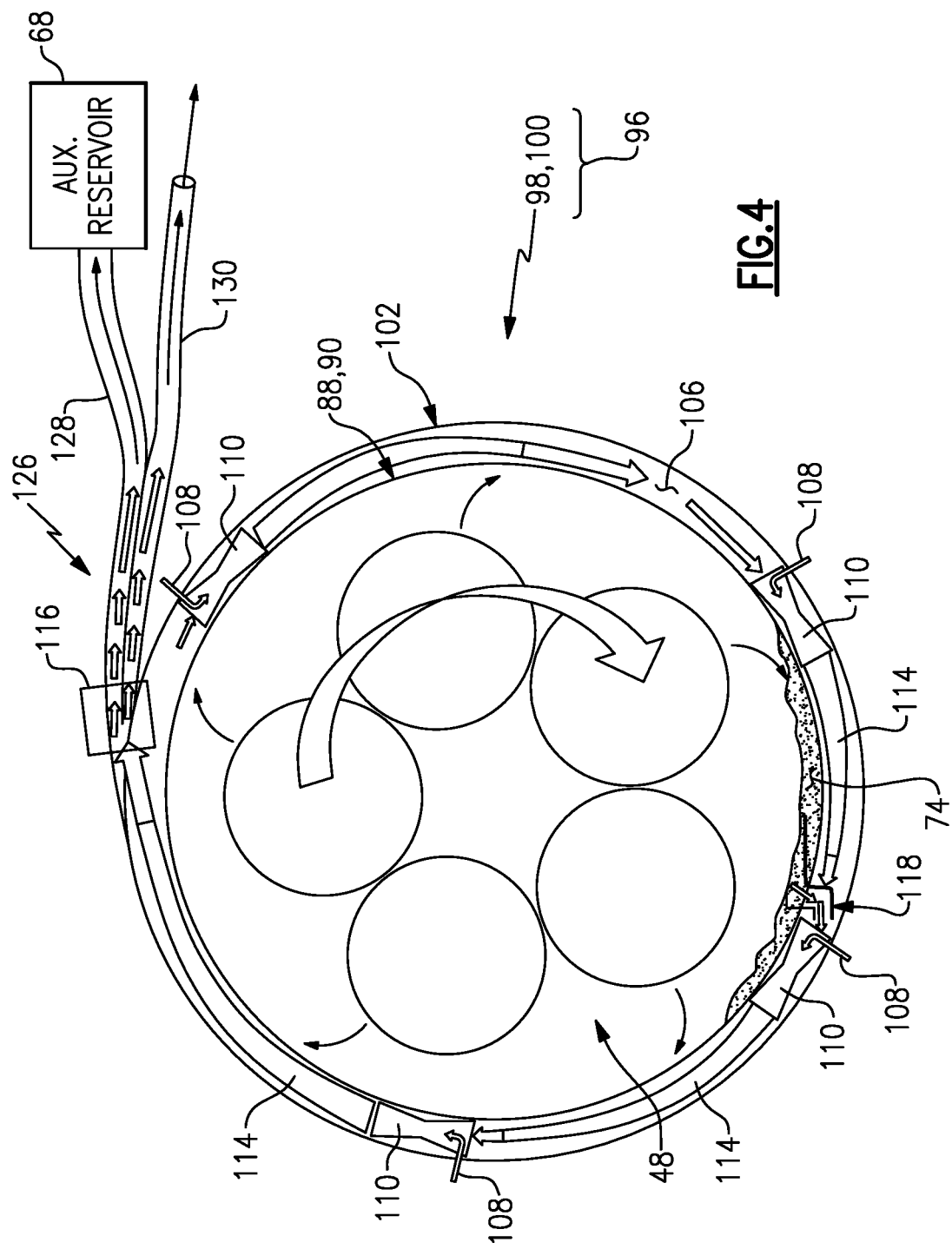
FIG. 4 is a schematic view of the example gutter system.

Referring to FIG. 4, with continued reference to FIG. 3, the accelerated lubricant 114 masses circumferentially about the gear system 48 and the axis A to an outlet 126. The example outlet 126 includes a separator 116 for separating the accelerated lubricant flow 114 from the bleed air motive flow 108. The heavier lubricant flow 114 exits through a radially outside passage 128 and is communicated to the auxiliary reservoir 68. The lighter bleed airflow 108 is communicated through a radially inner passage 130. The radially inner passage 130 may communicate the exhausted bleed airflow to another engine system or simply exhaust the flow to atmosphere.

In one disclosed example embodiment, four ejectors 110 are provided within the annular space 106. However, other numbers of ejectors 110 may be utilized to generate sufficient additional momentum to propel exiting lubricant flow to the auxiliary reservoir 68.

A scoop 118 extends outside of the radially inner gutter portion 104 to direct lubricant into the annular space 106 and one of the ejectors. Lubricant exhausted from the FDGS accumulates in the static baffles 88, 90 and is driven radially outward into the annular space 106. Once the lubricant is in the annular space 106, the motive flow 108 through the ejectors 110 accelerate the lubricant flow toward the outlet 126.

Figure 5:
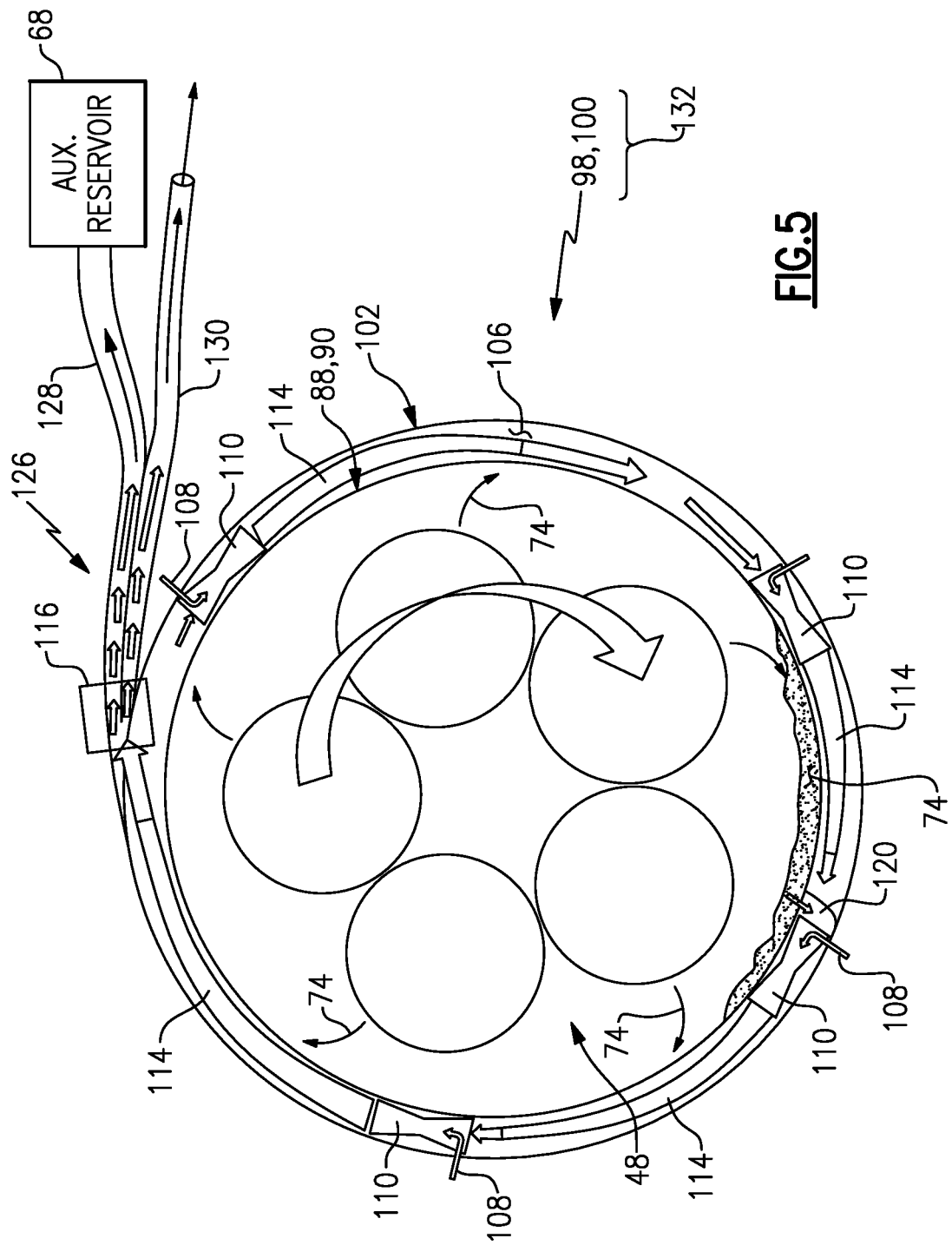
FIG. 5 is a schematic view of another example gutter system.

Referring to FIG. 5 with continued reference to FIG. 3, another example gutter system 132 is shown and includes an opening 120 for lubricant entering the annular space 106. In this example, the motive force through the ejector 110 is utilized to draw lubricant 74 gathered in the static baffles 88, 90 into the annular space 106. Accordingly, a scoop is not utilized to direct lubricant toward the ejector 110.

In one example operational embodiment, lubricant 74 is expelled from the rotating carrier 82 forward and aft of the gear system 48. The baffles 88, 90 are attached to the ring gear 84 and therefore are static relative to the carrier 82. Lubricant expelled by the carrier 82 has some circumferential and radially outward momentum and is captured and directed into a corresponding one of the static baffles 88, 90.

The radially outward momentum drives lubricant through openings 124 of the baffles 88, 90 as best shown in FIG. 3. Lubricant driven through openings 124 is drawn into the annular space 106 by either suction generated by the ejector 110 alone or with the aid of the scoop 118 (FIG. 4). The motive flow 108 drawn from the compressor section 24 is of a pressure and flow rate determined to generate the accelerated flow 114. The momentum and acceleration of lubricant provided by the motive flow 108 propels lubricant flow to the auxiliary reservoir 68 without an additional lubricant pump.

The accelerated lubricant flow 114 is separated from the motive flow 108 by the separator 116 to significantly deaerate the lubricant flow to the auxiliary reservoir 68. In the example disclosed embodiment, deaeration is facilitated by radially inner and outer passages 128 and 130 that exhaust heavier lubricant through the radially outer passage 128 and the lighter air through the radially inner passage 130. However, other separation means, methods and devices could be utilized and are within the contemplation and scope of this disclosure.

Accordingly, the example gear system includes lubricant ejectors to impart momentum on lubricant to drive the expelled lubricant away from the gear system and to the auxiliary reservoir.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
a sun gear configured to be driven by an engine shaft rotatable about an axis;
a plurality of intermediate gears intermeshed with the sun gear;
a ring gear assembly engaged with the plurality of intermediate gears, the ring gear configured for attachment to a static structure;

a carrier supporting rotation of the plurality of intermediate gears, the carrier is configured for rotation about the axis;
a fixed gutter system configured to receive expelled lubricant and to direct the expelled lubricant to an auxiliary reservoir;
at least one ejector disposed within the fixed gutter system and configured to utilize a motive flow to generate a lubricant flow through at least one outlet; and
a fan shaft rotatable about the axis and configured to be driven by the carrier.

2. The fan drive gear system as recited in claim 1, wherein the motive flow comprises a bleed airflow.

3. The fan drive gear system as recited in claim 2, wherein the fixed gutter system includes an outlet configured to separate the motive flow from the lubricant flow.

4. The fan drive gear system as recited in claim 1, wherein the fixed gutter system includes an annular space disposed between an inner static baffle portion and an outer gutter portion.

5. The fan drive gear system as recited in claim 4, wherein the at least one ejector is disposed within the annular space.

6. The fan drive gear system as recited in claim 5, including a plurality of inlets through the static baffle for communicating the received lubricant into the annular space.

7. The fan drive gear system as recited in claim 5, including at least one baffle where expelled lubricant is captured and directed into the fixed gutter system.

8. The fan drive gear system as recited in claim 7, wherein the ring gear includes a forward face and an aft face and the at least one baffle comprises a forward baffle attached to the forward face and an aft baffle attached to the aft face, and wherein the fixed gutter system comprises a forward gutter assembly radially outside the forward baffle and an aft gutter assembly radially outside the aft baffle.

9. The fan drive gear system as recited in claim 8, wherein each of the forward baffle and the aft baffle includes an annular accumulation portion, wherein accumulated lubricant is directed radially outward by circumferential and radial momentum imparted into the lubricant.

10. The fan drive gear system as recited in claim 9, wherein each of the intermediate gears is supported by a journal bearing supported within the carrier and lubricant expelled from each of the journal bearings is directed through the at least one baffle.

11. A turbine engine assembly comprising:
a static engine structure;
a fan section including a fan shaft coupled to a hub supporting a plurality of blades rotatable about an axis;
a fan drive gear system including;
a sun gear configured to be driven by an engine shaft rotatable about the axis, a plurality of intermediate gears;
a ring gear assembly fixed to the engine static structure;
a carrier supporting rotation of the plurality of intermediate gears, the carrier rotatable about the axis and coupled to drive the fan shaft; and
a forward gutter assembly configured to receive expelled lubricant forward of the carrier;
an aft gutter assembly configured to receive expelled lubricant aft of the carrier;
at least one ejector disposed within at least one of the forward gutter assembly and the aft gutter assembly and configured to utilizes a motive flow to generate a lubricant flow;
a primary lubricant system communicating lubricant to the fan drive gear system; and
an auxiliary lubricant system including an auxiliary reservoir configured to receive lubricant expelled from the fan drive gear system and communicated through the forward fixed gutter assembly and the aft fixed gutter assembly.

12. The turbine engine assembly as recited in claim 11, wherein the motive flow comprises a bleed airflow from a compressor section.

13. The turbine engine assembly as recited in claim 11, wherein each of the forward gutter assembly and the aft gutter assembly includes an outlet configured to separate the motive flow from the lubricant flow.

14. The turbine engine assembly as recited in claim 11, wherein each of the forward gutter assembly and the aft gutter assembly include an annular space disposed between an inner static baffle portion and an outer gutter portion.

15. The turbine engine assembly as recited in claim 14, wherein the at least one ejector is disposed within the annular space.

16. The turbine engine assembly as recited in claim 15, including at least one baffle where expelled lubricant is captured and directed into the fixed gutter system.

17. A lubrication system for a gas turbine engine comprising:
a baffle system configured for attachment to a fixed ring gear and configured to direct lubricant expelled from a fan drive gear system;
a forward gutter assembly configured to receive expelled lubricant forward of the ring gear;
an aft gutter assembly configured to receive expelled lubricant aft of the ring gear;
at least one ejector disposed within at least one of the forward gutter assembly and the aft gutter assembly and configured to utilize a motive flow to generate a lubricant flow;
a primary lubricant system communicating lubricant to the fan drive gear system; and
an auxiliary lubricant system including an auxiliary reservoir configured to receive lubricant expelled from the fan drive gear system and communicated through the forward fixed gutter assembly and the aft fixed gutter assembly.

18. The lubrication system as recited in claim 17, wherein each of the forward gutter assembly and the aft gutter assembly includes an outlet configured to separate the motive flow from the lubricant flow.

19. The turbine engine assembly as recited in claim 18, wherein each of the forward gutter assembly and the aft gutter assembly include an annular space disposed between an inner static baffle portion and an outer gutter portion.

* * * * *